(12) United States Patent
Koon et al.

(10) Patent No.: US 7,897,239 B2
(45) Date of Patent: Mar. 1, 2011

(54) HIGHLY TAILORED STIFFENING FOR ADVANCED COMPOSITES

(75) Inventors: Robert Koon, Acworth, GA (US); Stephen P. Engelstad, Marietta, GA (US); Brian Tatting, Schenectady, NY (US); Zafer Gurdal, Blacksburg, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 168 days.

(21) Appl. No.: 12/241,220

(22) Filed: Sep. 30, 2008

(65) Prior Publication Data

US 2009/0169833 A1 Jul. 2, 2009

Related U.S. Application Data

(60) Provisional application No. 60/984,613, filed on Nov. 1, 2007.

(51) Int. Cl.
*B32B 3/02* (2006.01)

(52) U.S. Cl. .................... 428/116; 428/178; 264/257

(58) Field of Classification Search ............... 428/34.5, 428/36.3, 116, 299.1; 264/257
See application file for complete search history.

(56) References Cited

U.S. PATENT DOCUMENTS

| | | | | |
|---|---|---|---|---|
| 3,975,882 A | * | 8/1976 | Walter | 52/571 |
| 4,012,549 A | * | 3/1977 | Slysh | 428/116 |
| 4,086,378 A | * | 4/1978 | Kam et al. | 428/34.5 |
| 5,038,693 A | | 8/1991 | Kourtides et al. | |
| 5,200,251 A | * | 4/1993 | Brand | 428/156 |
| 5,277,959 A | | 1/1994 | Kourtides et al. | |
| 5,413,456 A | * | 5/1995 | Kulak et al. | 415/9 |
| 5,514,444 A | * | 5/1996 | Buyny et al. | 428/116 |
| 5,527,584 A | * | 6/1996 | Darfler et al. | 428/116 |
| 5,580,502 A | | 12/1996 | Forster et al. | |
| 5,723,849 A | | 3/1998 | Matsen et al. | |
| 5,771,680 A | * | 6/1998 | Zahedi et al. | 60/226.1 |
| 5,811,168 A | | 9/1998 | Rasky et al. | |
| 6,064,352 A | * | 5/2000 | Silverman et al. | 343/912 |
| 6,098,926 A | * | 8/2000 | Morgenthaler | 244/119 |
| 6,261,675 B1 | * | 7/2001 | Hsiao et al. | 428/219 |
| 6,290,799 B1 | * | 9/2001 | Deckers et al. | 156/264 |
| 6,475,596 B2 | * | 11/2002 | Hsiao et al. | 428/116 |
| 6,692,681 B1 | | 2/2004 | Lunde | |
| 7,048,024 B2 | | 5/2006 | Clark et al. | |
| 7,226,559 B2 | | 6/2007 | Maxwell et al. | |
| 7,479,201 B1 | * | 1/2009 | Wegner et al. | 156/242 |
| 2003/0183067 A1 | | 10/2003 | Cundiff et al. | |
| 2005/0023414 A1 | | 2/2005 | Braun | |
| 2005/0236735 A1 | | 10/2005 | Oldani et al. | |
| 2006/0062973 A1 | | 3/2006 | Wilson | |
| 2006/0096700 A1 | | 5/2006 | Clark et al. | |
| 2006/0108058 A1 | | 5/2006 | Chapman et al. | |
| 2007/0029038 A1 | | 2/2007 | Brown et al. | |
| 2009/0169833 A1 | * | 7/2009 | Koon et al. | 428/195.1 |

* cited by examiner

*Primary Examiner* — N. Edwards
(74) *Attorney, Agent, or Firm* — Gardner Groff Greenwald & Villanueva P.C.

(57) ABSTRACT

Described herein are composites that are composed of a plurality of plies with a stiffening grid intimately embedded within the composite. The composite structures have the improved buckling performance characteristics of known isogrid and orthogrid composite structures and yet have a significantly higher damage tolerance that permits such structures to be used in the formation of aircraft and spacecraft designs. Also described herein are methods for making the composites.

21 Claims, 8 Drawing Sheets

US 7,897,239 B2

HIGHLY TAILORED STIFFENING FOR ADVANCED COMPOSITES

CROSS REFERENCE TO RELATED APPLICATIONS

This application claims priority upon U.S. provisional application Ser. No. 60/984,613, filed Nov. 1, 2007. This application is hereby incorporated by reference in its entirety for all of its teachings.

BACKGROUND

The utilization of isogrid and/or orthogrid stiffening of advanced composite materials have been shown analytically and experimentally to exhibit some of the lowest weight designs for aircraft and spacecraft structures. Additionally, it has been found that isogrid and orthogrid stiffened composites exhibit excellent buckling performance. Currently, the manufacture of such known grid stiffened composite structures involves fabricating the skin plies and then building up the grid stiffening on the skin's inner mold line. However, the challenge and problem with this approach is that the grid is co-cured or bonded to the skin's inner mold line, which makes the grid susceptible to de-bonding from the skin as a result of impact damage to the skin's outer mold line. Thus, because of the poor damage tolerance characteristics of known grid stiffened composite structures, such grid stiffened composite structures are typically not capable for use on aircraft and spacecraft design despite the weight advantages.

Thus it can be seen that needs exist for improvements to grid stiffened composite materials that are low weight and exhibit high damage tolerance characteristics, such that the composite materials are capable of being used in aircraft and spacecraft designs. The composites and methods described herein address these needs.

SUMMARY

The present invention solves the problems associated with known isogrid and orthogrid stiffened composite structures. Described herein are composites that are composed of a plurality of plies with a stiffening grid intimately embedded within the composite. The composite structures have the improved buckling performance characteristics of known isogrid and orthogrid composite structures and yet have a significantly higher damage tolerance that permits such structures to be used in the formation of aircraft and spacecraft designs. Also described herein are methods for making the composites.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The accompanying drawings, which are incorporated in and constitute a part of this specification, illustrate several aspects described below. Like numbers represent the same elements throughout the figures.

DETAILED DESCRIPTION

Figure 1:
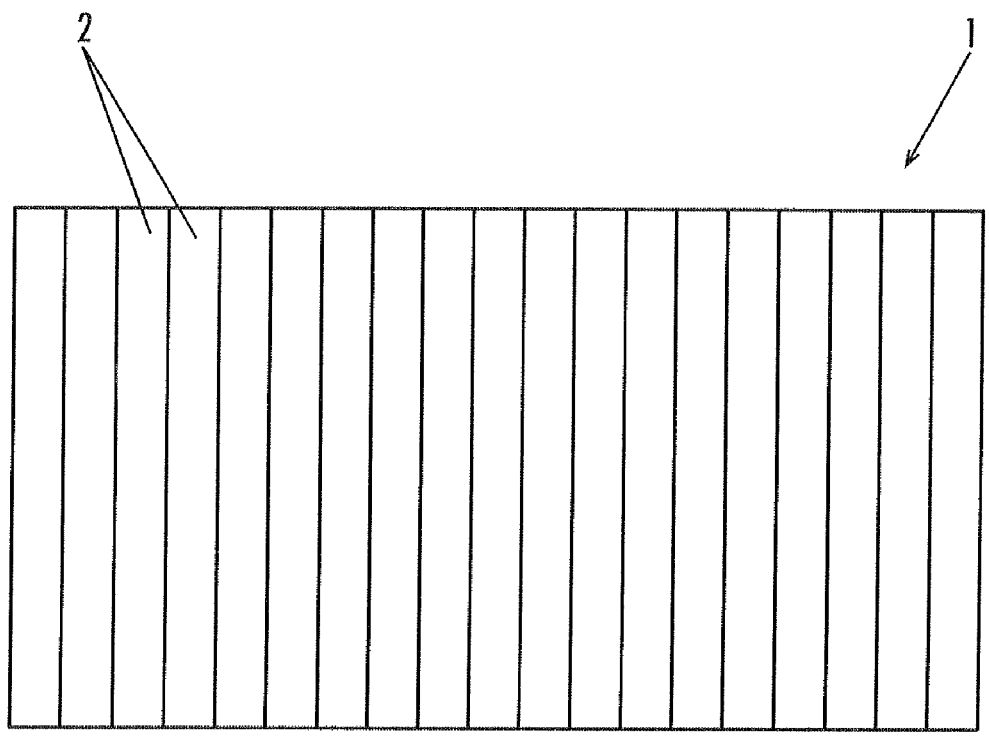
FIG. 1 shows the top view of a course produced by a plurality of prepreg tows.

The present invention may be understood more readily by reference to the following detailed description, which forms a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Described herein are composites capable of being used in the construction and formation of aircraft and spacecraft components. In one aspect, the composite is produced by the following process:

a. applying at least one embedded prepreg tow to the surface of a base course;

b. applying a second course on the base course, wherein at least a portion of the second course stack overlaps with at least one embedded prepreg tow on the surface of the base course to produce a precomposite having a grid structure produced by the embedded prepreg tow; and c. curing the precomposite.

Each component and step is described in detail below.

The precomposite is composed of a plurality stacked plies. Each ply is in turn produced by a plurality of courses abutted or overlapped with one another to produce an individual ply. In one aspect, the courses are composed of a fiber reinforced resin. In one aspect, each course is produced by a plurality of prepreg tows. The term "prepreg tow" as used herein is a material having a plurality of fibers with a curable resin impregnated throughout the fibers. In one aspect, the fiber can be glass, aramid, carbon, or boron fibers. In one aspect, the curable resin is a thermosetting resin. Examples of thermosetting resins useful herein include, but are not limited to, an epoxy resin, a cyanate ester resin, a phenolic, a bismaleimide, a polyurethane, an allyl resin, formaldehyde-based thermoset plastics (e.g., melamine formaldehyde, phenol formaldehyde and urea formaldehyde), polyimide-based thermosets, silicones (or polysiloxanes) or any combination thereof. In one aspect, the prepreg tow is composed of carbon fibers and epoxy resins that can be cured in an autoclave or oven. In another aspect, the prepreg tow includes a resin cured by exposure to an electron beam (E-beam), microwave, X-ray, or ultraviolet (UV) radiation.

Courses produced from prepreg tows can be manufactured using techniques known in the art. In one aspect, a series of prepreg tows in the form of slit tape can be aligned with one another to form a course. This is depicted in FIG. 1, where course 1 is composed of a series of prepreg tows 2. Automated fiber placement machines known in the art can be used to manufacture the courses, abut or overlap the courses to produce the plies, and stack the plies to ultimately produce the composite. The automated fiber placement machines disclosed in International Publication No. WO/2005/105641 as well as those sold by Ingersoll Machine Tools can be used to produce the composites described herein. In summary, the machine is fed by a series of individual strips of tape having a narrow thickness (e.g., 0.125 to 1.00 inch wide). The feed can be towpreg (individually formed narrow prepreg tows) or slit tape (formed from wide prepreg tapes slit to the desired tow width). The dispensing roller head then lays these narrow strips of tape down simultaneously with the capability to stop and start individual strips in any pattern. With this capability, part thickness and thus strength can be varied nearly continuously along the part to best meet expected loads at minimum weight. Using the fiber placement machines, a plurality of courses can be abutted or overlapped with one another to produce plies with varying dimensions.

Figure 2:
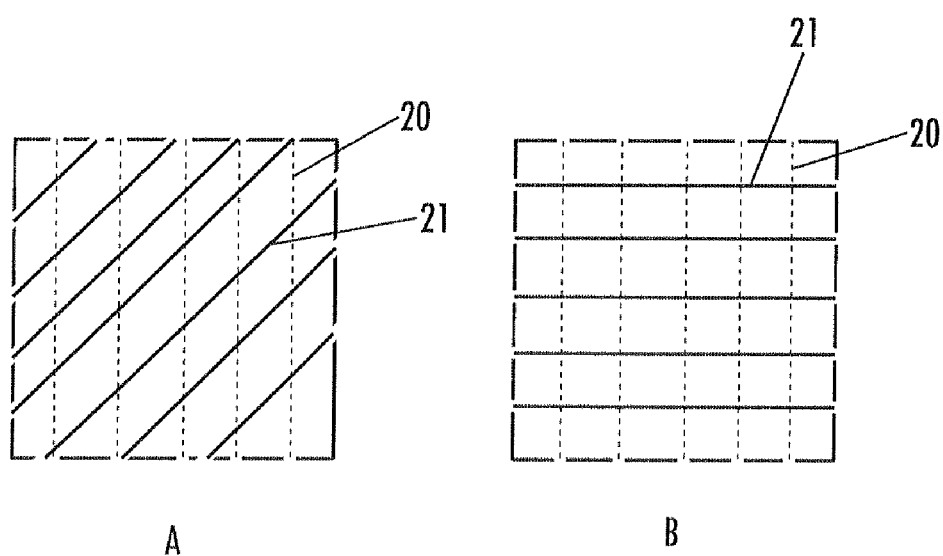
FIG. 2 shows the top view of two adjacent plies positioned relative to each other.

Using the automated fiber placement machines described above, the position of the plies relative to one another can vary. Referring to FIG. 2, two plies are positioned on top of each other. In FIG. 2A, ply 21 (tows indicated by solid lines used to produce the course) is positioned on top of ply 20 (tows indicated by dashed lines used to produce the course) 45 degrees relative to ply 20. In FIG. 2B, ply 21 is positioned on top of ply 20 at 90 degrees relative to ply 20. It is contemplated that one ply can be positioned from 0 to 90 degrees relative to an adjacent ply. In one aspect, the plies can be positioned such that the plies are positioned to one another is a repetitive manner. For example, ply 2 can be applied on ply 1 and positioned 45° relative to ply 1, and ply 3 can be applied to ply 2 and positioned 90° relative to ply 1. Next, ply 4 can be applied to ply 3 and positioned 0° relative to ply 1, followed by applying ply 5 on ply 4 such that ply 5 is 45° relative to ply 4, followed by applying ply 6 on ply 5 such that ply 6 is 90° relative to ply 4. This pattern of plies is depicted by the formula $(0°/45°/90°)_n$, where n is the number of repeat sequences of plies in the ply stack. In this aspect, a ply stack is produced by a series of plies aligned at three different orientations.

Depending upon the application of the composite, the thickness of the composite can vary extensively. In one aspect, the composite is composed 2 to 100 adjacent (i.e., stacked) plies. In such cases, the composite can have a thickness ranging from 0.01 inches to over 0.50 inches. Composites commonly used in aircraft and spacecraft structures range in thickness from 0.10 inches to 0.30 inches.

Figure 3:
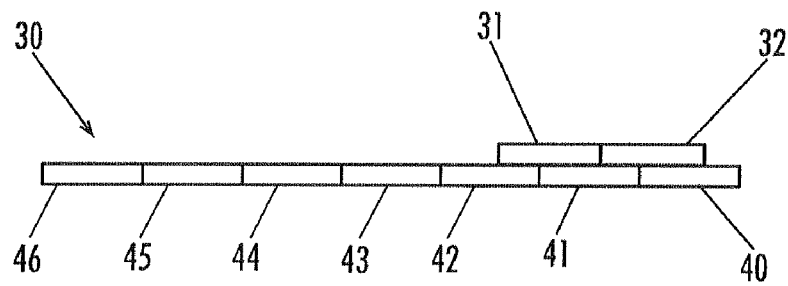
FIG. 3 shows a cross-sectional view of two prepreg tows on the surface of a base course.
Figure 4:
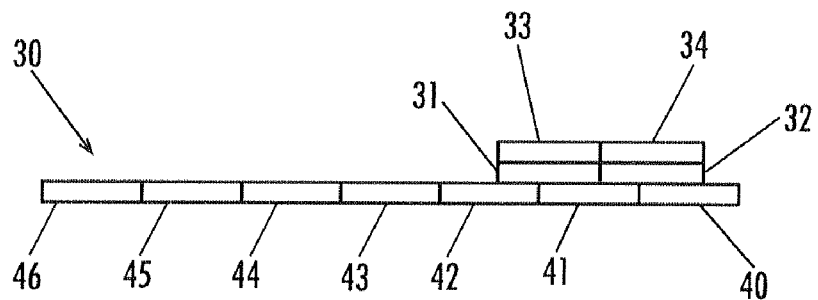
FIG. 4 shows a cross-sectional view of four stacked prepreg tows on the surface of the base course used to produce a stiffener.

Using the automated fiber placement machines and techniques described above, at least one embedded prepreg tow is applied to the developing ply stack. In particular, the embedded prepreg tow is applied to the surface of a course (i.e., base course) used to produce the exposed ply on the ply stack. The placement of the embedded prepreg tow on the surface of the base course is depicted in FIG. 3, where two embedded prepreg tows (31 and 32) have been applied to the surface of the base course 30. FIG. 3 shows the cross-section view of the course 30 composed of a series of prepreg tows (40-46). Although two embedded prepreg tows are depicted in FIG. 3, it is contemplated that 1 to 10 embedded prepreg tows can be applied directly to the base course. It is also contemplated that two or more embedded prepreg tows can be stacked on top of each other, which is depicted in FIG. 4 (31-34). The embedded prepreg tows can be any of the materials described above used to produce the courses. In certain aspects, the embedded prepreg tows are the same tows used to produce the courses. In one aspect, the embedded prepreg tows and tows used to produce the courses are slit tape composed of carbon fibers and epoxy resin manufactured by Hexcel Corporation.

Figure 5:
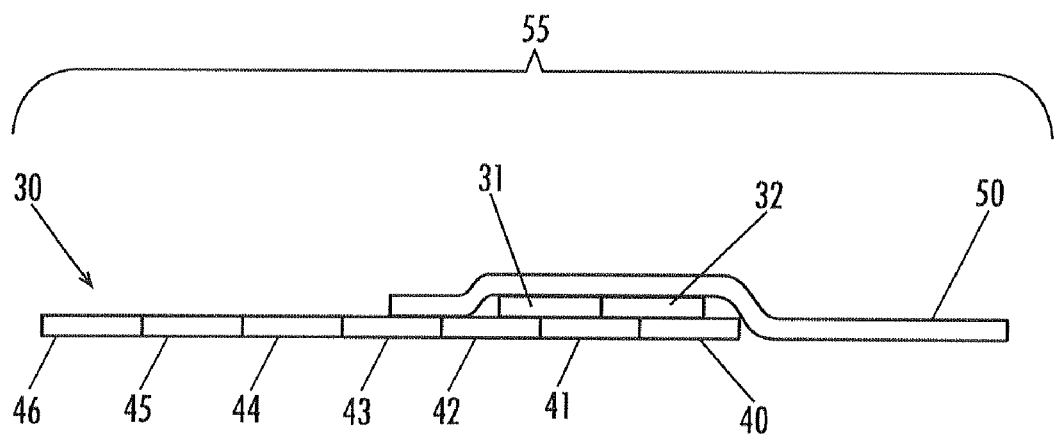
FIG. 5 shows a cross-sectional view of a second course overlapping with two embedded prepreg tows and the first base course to produce an embedded grid stiffener.
Figure 6:
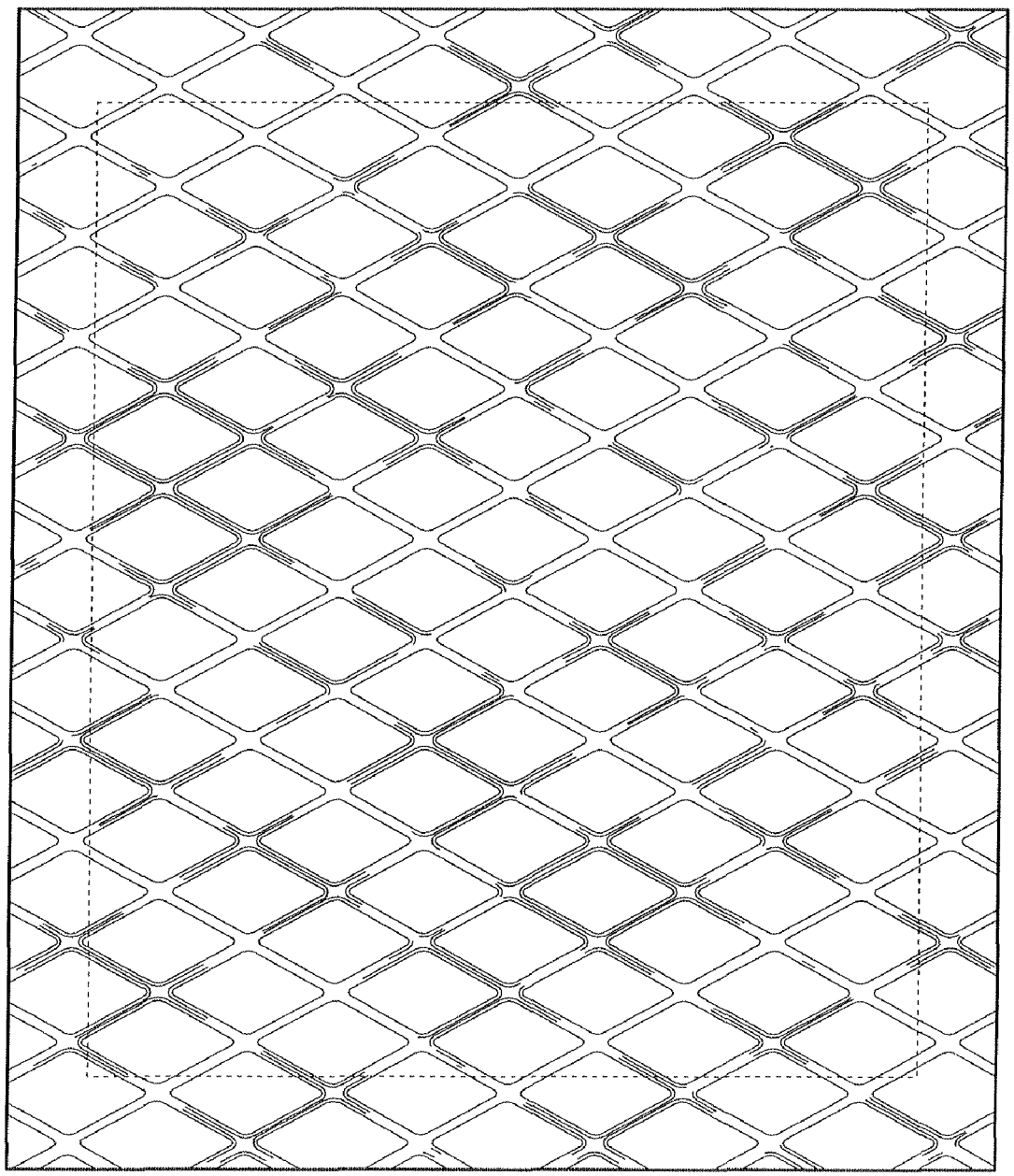
FIGS. 6-11 shows top views of composites produced herein with different grid structures.
Figure 7:
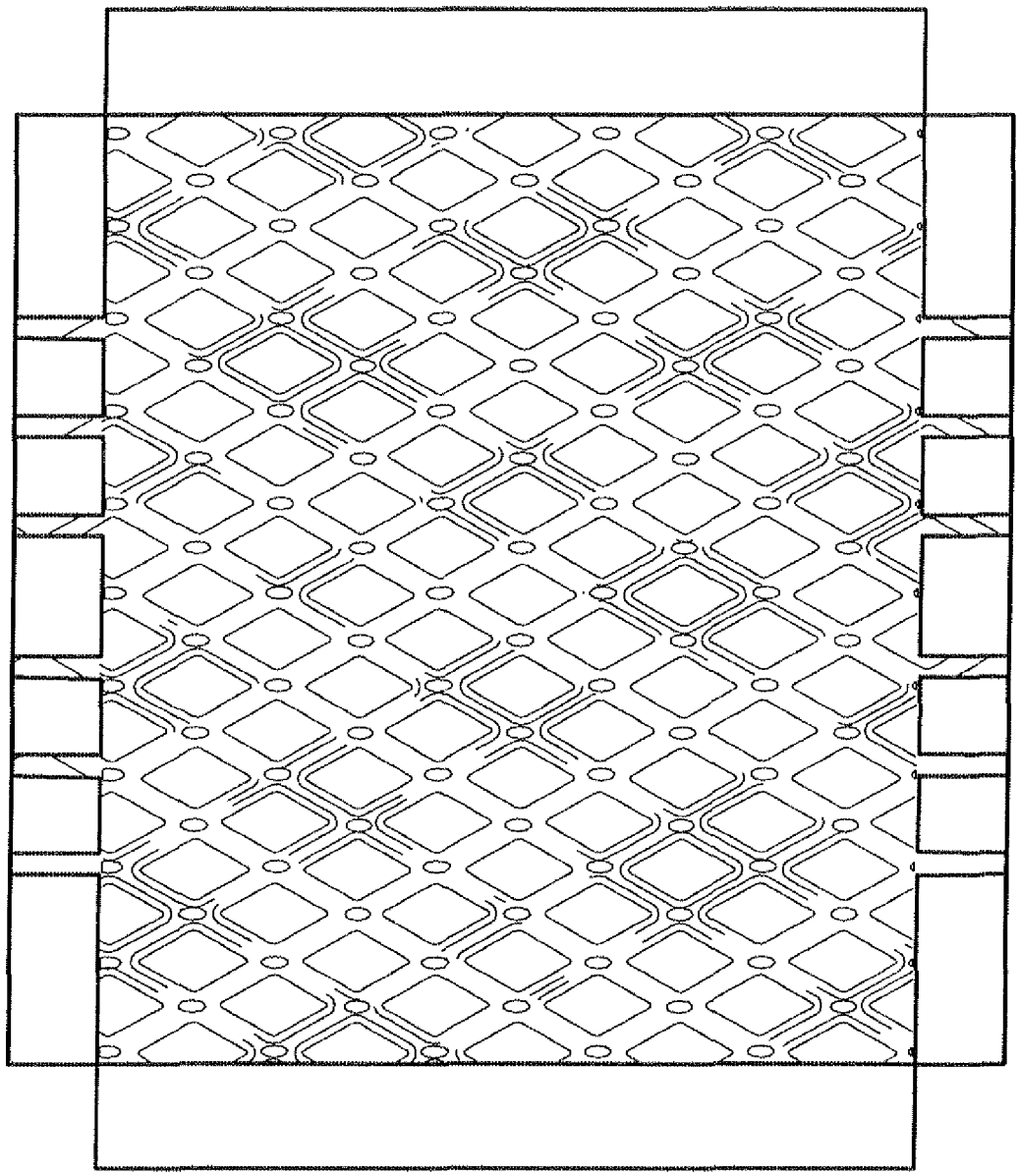

Once the embedded prepreg tow has been applied to the base course, a second course is applied on the base course such that at least a portion of the second course overlaps with at least one embedded prepreg tow on the surface of the base course to produce a precomposite. An example of this is shown in FIG. 5, where second course 50 (tows not shown) is applied over embedded prepreg tows 31 and 32. The second course is also in contact with the base course 30 at prepreg tows 40, 42 and 43; however, the amount of overlap between the base course and second base course can vary. The embedded prepreg tows 31 and 32 and the second course 50 overlapping the embedded prepreg tows results in the formation of a raised stiffener relative to the base course 30. A grid structure is produced within the precomposite by sequentially embedding prepreg tows in some or all of the plies during the stacking of the plies. The composite structure depicted in FIG. 5 represents a single ply 55 composed of two courses. However, as discussed above, the ply can be produced from several overlapping courses and embedded prepreg tows to produce very large plies with a grid structure.

The positioning and application of the embedded prepreg tows on the base course followed by the positioning and application of the second course can be controlled by software communicating with the automated fiber placement machine. Manufacturers of automated fiber placement machines, like Ingersoll Machine Tools, provide the software that directs the machine in its positioning and application of the courses and embedded tows. Customized composite design software, such as that developed and provided by Adoptech, Inc. (referred to as "Optimization of Laminates using Genetic Algorithms" OLGA) can be used to configure the grid stiffened panel to satisfy the structural requirements of the component. This software is also used to predict the structural performance of the grid stiffened design. The algorithms and techniques disclosed in "Design of variable stiffness composite panels for maximum fundamental frequency using lamination parameters" Abdalla, Mostafa M. (Aerospace Structures, Delft University of Technology); Setoodeh, Shahriar; Gurdal, Zafer Source: Composite Structures, v 81, n 2, November, 2007, p 283-291; "Stacking sequence blending of multiple composite laminates using genetic algorithms" Soremekun, Grant (ADOPTECH Inc.); Gurdal, Zafer; Kassapoglou, Christos; Toni, Darryl Source: Composite Structures, v 56, n 1, April, 2002, p 53-62; and "Analysis of tow placed, parallel fiber, variable stiffness laminates" Waldhart, C. (Virginia Polytechnic Inst and State Univ); Gurdal, Z.; Ribbens, C. Source: Collection of Technical Papers— AIAA/ASME/ASCE/AHS/ASC Structures, Structural Dynamics & Materials Conference, v 4, 1996, p 2210-2220 can be used herein.

Figure 8:
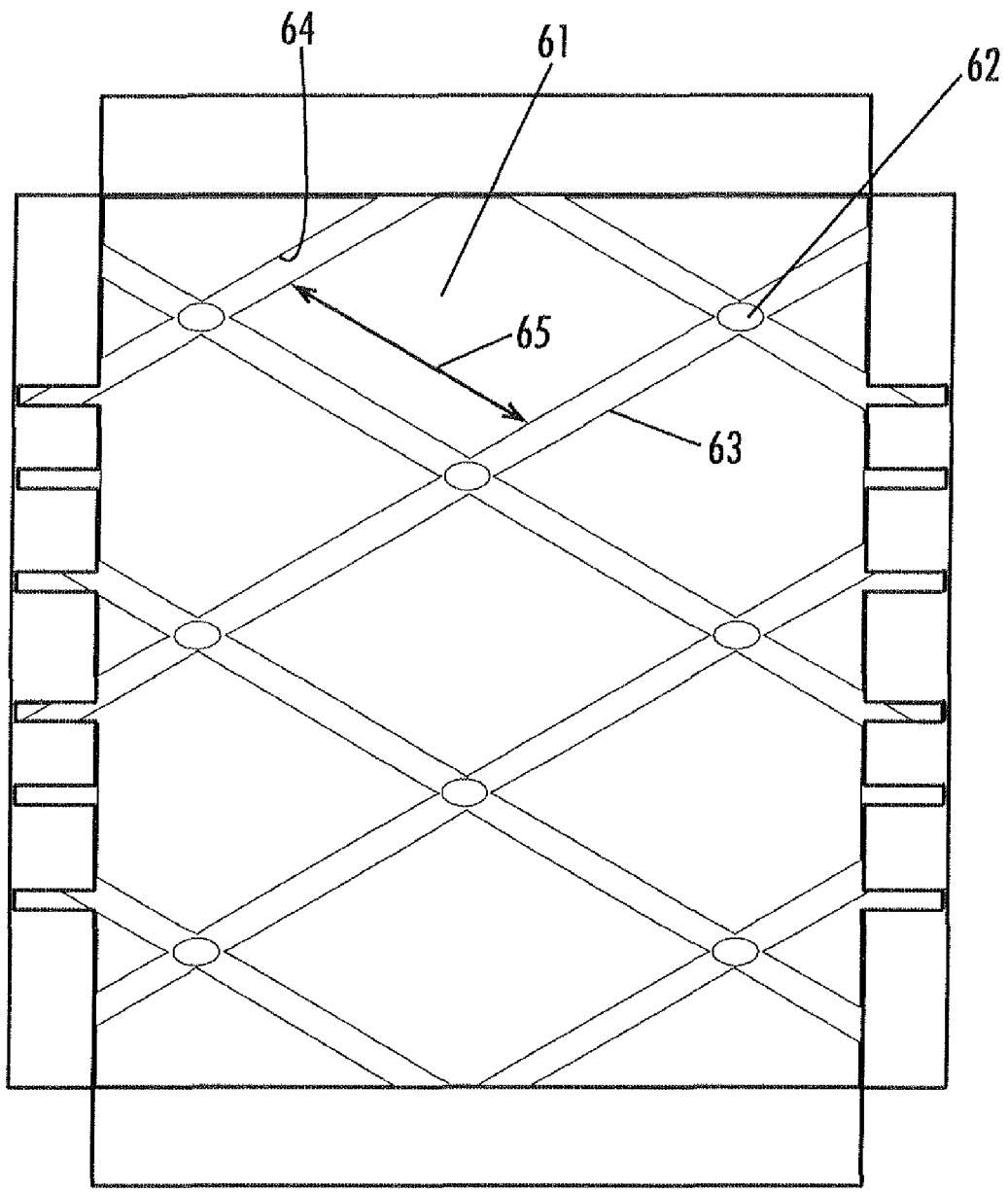
Figure 9:
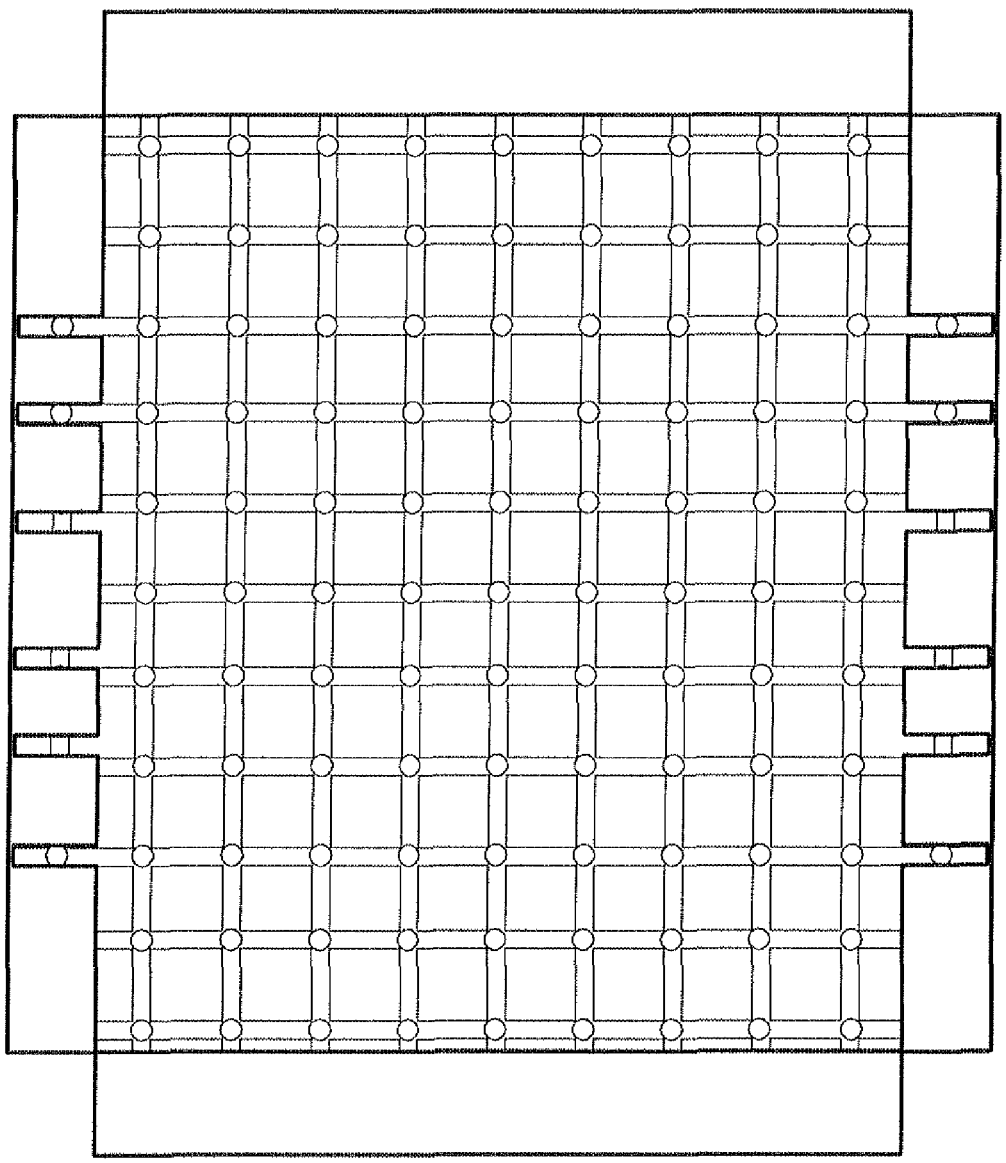
Figure 10:
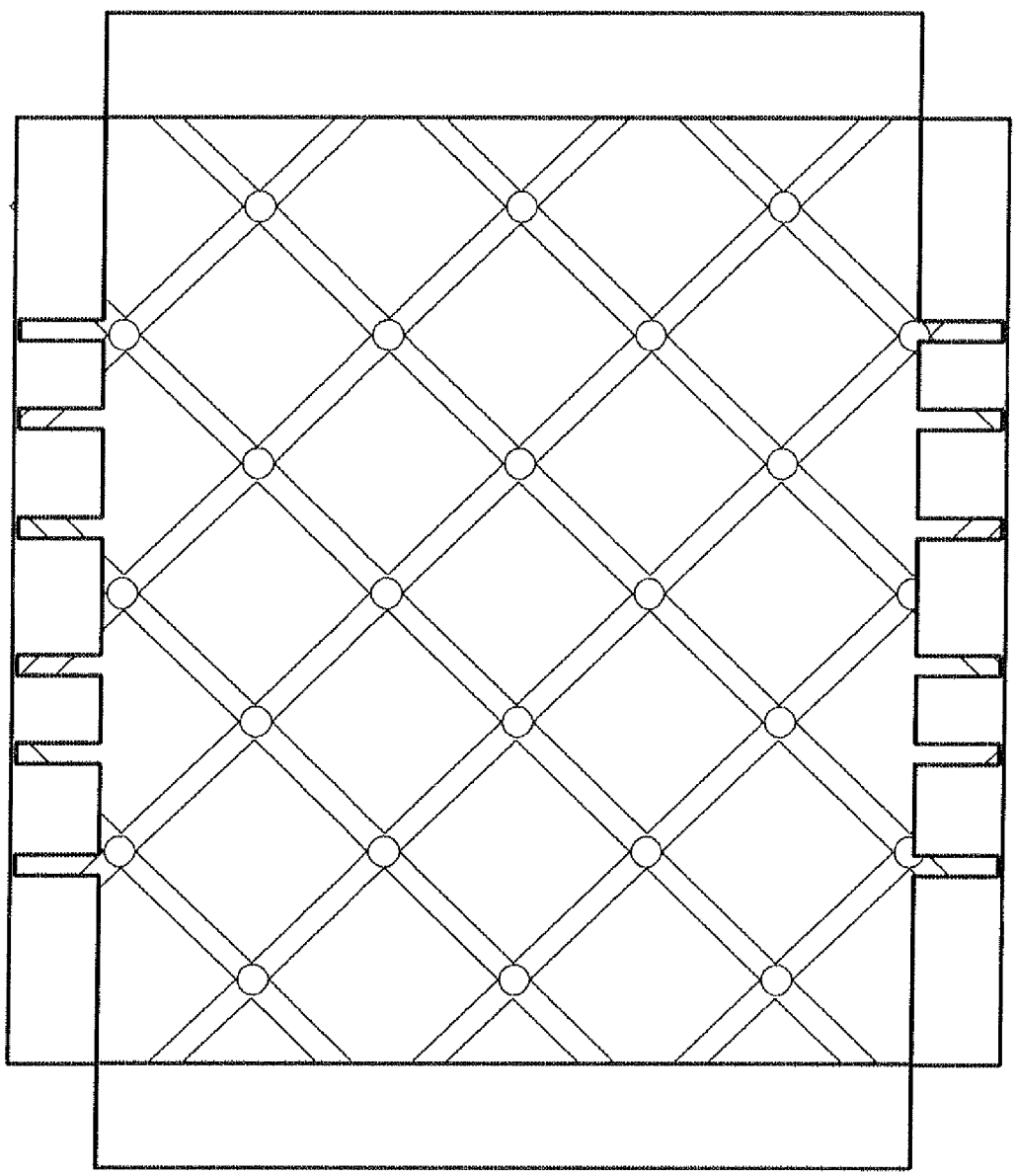
Figure 11:
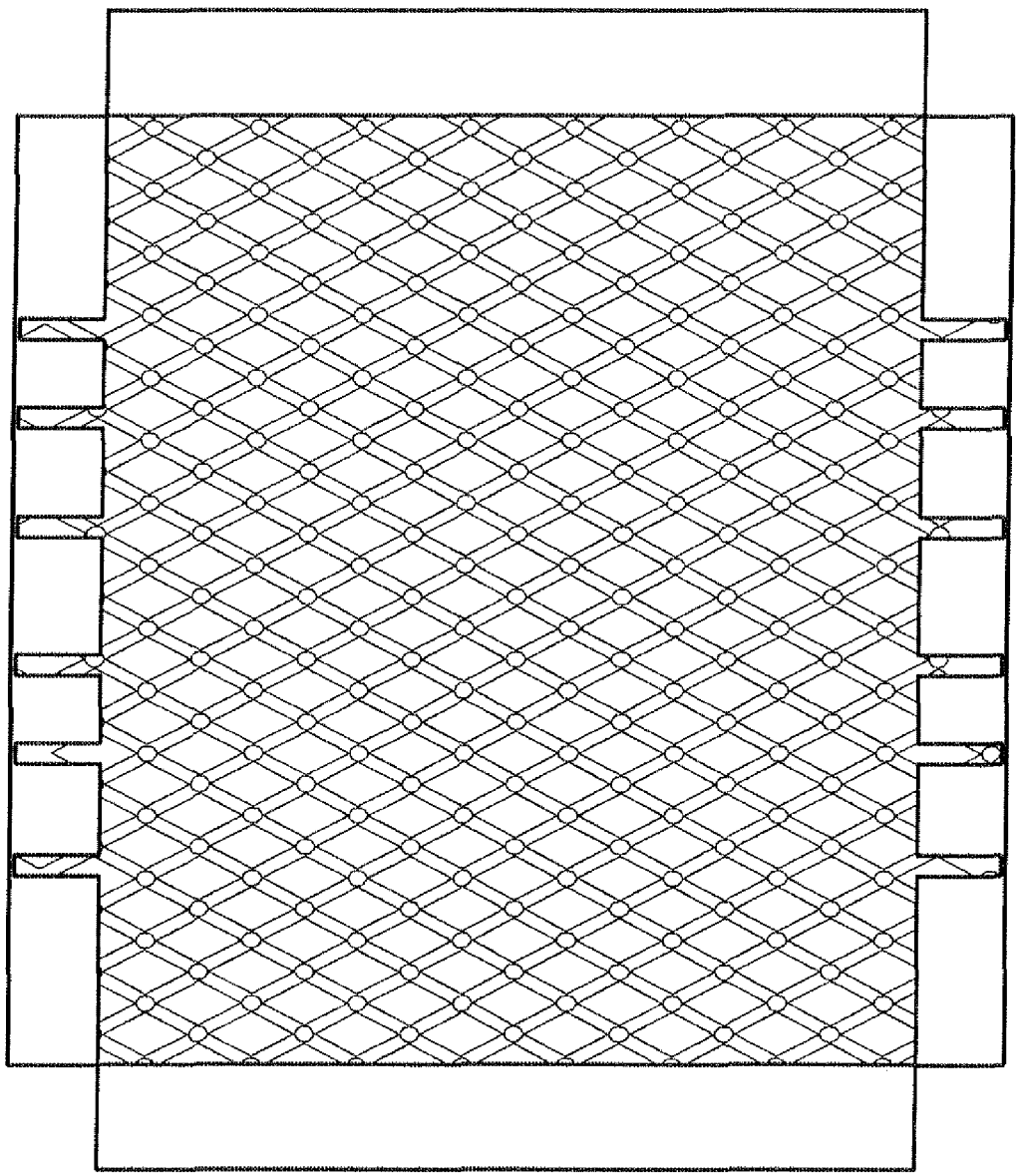

The placement of the embedded prepreg tows and subsequent overlapping plies ultimately produces a grid structure on the composite. Additionally, the dimensions of the grid structure (e.g., pattern of stiffeners, height and width of the stiffeners, etc.) can also be controlled as well. FIGS. 6-11 show exemplary grid patterns. Referring to FIG. 8, the grid structure (represented by dashed lines) is embedded within the substrate panel 61. Where grids overlap, these are referred to as nodes (62). A variety of different grid patterns are possible using the techniques described herein. The grids depicted in FIGS. 6-11 are straight lines; however, the grids can also be curvilinear as well.

The number of embedded prepreg tows stacked on each other (see FIG. 4 for example) can be used to vary the height of the stiffeners and the grid structure. In one aspect, the stiffeners in the grid structure have a height from 0.05 inches to 0.15 inches as measured from the unstiffened substrate surface. The width of each stiffener can be varied by the number of embedded prepreg tows that are applied to the surface of the base course (i.e., the number of embedded tows that are applied side-by-side). In one aspect, each stiffener has a width from 0.1 inches to 0.75 inches. As depicted in FIGS. 6-11, the number of stiffeners and the distance between them can vary. Referring to FIG. 8, the distance between stiffeners 63 and 64 is the distance 65. Although the distances between each stiffener can vary, it is desirable in certain aspects that the stiffeners be evenly spaced apart from each other. In one aspect, the stiffeners are from 1 to 10 inches apart from each other.

After the precomposite has been prepared, it is cured. The curing step sets the curable resin to form a polymeric matrix throughout the composite, which intimately bonds the stiffeners (and grid structure) within the substrate. This ultimately increases the strength of the composite. The curing step can be performed using techniques known in the art. For example, when the curable resin is a thermosetting resin, the precomposite can be placed in an autoclave and heated for a sufficient time and temperature to cure the resin. Alternatively, the resin can be cured using other techniques such as, for example, exposure to an electron beam (E-beam), microwave, X-ray, or ultraviolet (UV) radiation.

In certain aspects, the curing step is performed using an autoclave. For example, the precomposite is placed in a vacuum bag and put into an autoclave oven where it is heated to a melting temperature of the curable resin while under vacuum. Pressure is then applied to the precomposite within the autoclave and this pressure is maintained until the composite cools.

The composites produced by the methods described herein are composed of a plurality of stiffeners intimately bonded within the substrate composite to form a raised grid structure on the surface of the composite. As previously mentioned, traditional orthogrid and isogrid stiffened composite materials have a low tolerance to impact damage. The methods described herein permit the formation of damage tolerant stiffeners to be formed within the composite, which leads to improved buckling performance over unstiffened composites. The composites described herein are lower in weight yet have similar if not improved properties when compared to baseline quasi-isotropic composite layups. For example, the weight of the composites described herein are about 15% to 35% lower than baseline quasi-isotropic composite layups yet have comparable buckling performance. Finally, the composites produced by the methods described herein are the result of a practical and cost effective means to manufacture aircraft and spacecraft structures. Structural characterization and certification of these structures are accomplished using established procedures known in the art.

The methods described herein can be used to make a variety of different articles with varying shapes and dimensions. In the case when the composites are used in the production of aircraft and spacecraft, the composites can be manufactured as large, single pieces. For example, the composites can be used to manufacture the wing of aircraft. By using a single piece of composite to produce the aircraft or spacecraft part versus multiple parts, the resultant part is structurally more sound and requires fewer fasteners, which ultimately reduces the weight and cost of the part. Additionally, in situations where additional parts need to be secured to the composite, adhesives instead of fasteners can be used to secure the part. The resin can be the same or different resin used to produce the composite.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Only reasonable and routine experimentation will be required to optimize such process conditions.

Table 1 provides detailed descriptions of several test panels used to verify the design, fabrication and structural performance of grid stiffened composites produced by the methods described herein.

Layup: The orientation of plies and embedded tows for the entire test panel.

Stiffener: The number of embedded prepreg tows encompassed by overlapping plies. The prepreg tows are carbon fibers impregnated with epoxy resin manufactured by Hexcel Corporation. The prepreg tows are approximately 0.125 inches wide and from 0.0052 to 0.0058 inches thick. As an example, 4 wide/2 high means four prepreg tows are applied side-by-side to the prepreg ply substrate and stacked two high.

Overlap: The number of tows on the base ply that are overlapped by the second ply.

Stiffener Spacing: The distance in inches between parallel stiffeners.

Base Plies: The number of plies used to manufacture the base substrate, which does not include the embedded tows.

Stiffener Plies: The number plies used to produce the stiffener, which includes the number of plies used to produce the base.

Stiffener Thickness: The height of the laminate at the stiffeners in inches.

Stiffener Height: The height of the stiffeners in inches as measured from the base substrate.

Intersecting Plies: The number of plies at the nodes, which includes the number of plies from the overlapping base substrates.

Weight Savings: The percent reduction of the composites described herein relative to a quasi-isotropic composite having a weight of 1.4193 lbs/ft$^2$. This weight savings was estimated using Adoptech OLGA software. The OLGA software estimates were previously verified by combined compression and shear loads testing of quasi-isotropic panels and the grid stiffened panels represented in FIG. 6.

While the invention has been described with reference to preferred and example embodiments, it will be understood by those skilled in the art that a variety of modifications, additions and deletions are within the scope of the invention, as defined by the following claims.

TABLE 1

| Figure | Layup | Stiffener | Overlap | Stiff. Spacing | Base plies | Stiff. Plies | Stiffener height | Inter. Plies | Weight Savings |
|---|---|---|---|---|---|---|---|---|---|
| 6 | [±45(±30$_3$/0/±15]s * | 2 wide, 1 high | 3.5 tow overlap | 3 | 22 | 34 | 0.0636 | 46 | 21.2 |
| 7 | [±45/±30$_3$]s | 4 wide, 2 high | 5.5 tow overlap | 3 | 16 | 34 | 0.0954 | 52 | 25.5 |
| 8 | [±45/±30$_4$]s | 4 wide, 3 high | 5.5 tow overlap | 9 | 20 | 52 | 0.1696 | 84 | 27.4 |
| 9 | [±45/90/0/90$_2$/0/90]s | 2 wide, 4 high | 3.5 tow overlap | 3 | 16 | 36 0's, 56 90's | 0.212 | 76 | 34.1 |
| 10 | [0/90/±45$_3$]s | 4 wide, 4 high | 5.5 tow overlap | 6 | 16 | 46 | 0.159 | 76 | 32.8 |
| 11 | [±45/±30$_2$/0]s | 2 wide, 5 high | 3.5 tow overlap | 2 | 14 | 38 | 0.1272 | 62 | 31.8 |

What is claimed is:

1. A composite produced by the process comprising:
   a. applying at least one embedded prepreg tow to the surface of a base course;
   b. applying a second course to the base course, wherein at least a portion of the second course overlaps with at least one embedded prepreg tow on the base course to produce a precomposite comprising a grid structure; and
   c. curing the precomposite to produce the composite wherein the grid structure is incorporated within the composite, and the grid structure is not an isogrid or orthogrid.

2. The composite of claim 1, wherein the base course and the second course are produced by a plurality of prepreg tows.

3. The composite of claim 2, wherein the prepreg tows in the base course and second course are the same as the embedded prepreg tow applied to the base course surface.

4. The composite of claim 2, wherein the prepreg tows in the base course and second course are different than the embedded prepreg tow applied to the base course surface.

5. The composite of claim 2, wherein the prepreg tows in the base course, second course, and the embedded prepreg tows comprise a fiber impregnated with one or more curable resins.

6. The composite of claim 5, wherein the fiber comprises glass, aramid, carbon, or boron fibers.

7. The composite of claim 5, wherein the curable resin comprises a thermosetting resin, and the thermosetting resin comprises an epoxy resin, a cyanate ester resin, a phenolic, a bismaleimide, a polyurethane, an allyl resin, a formaldehyde-based thermoset plastic, a polyimide-based thermoset, silicone, a polysiloxane, or any combination thereof.

8. The composite of claim 2, wherein the prepreg tows in the base ply, second ply, and the embedded prepreg tows comprise carbon fibers impregnated with a thermoset epoxy resin.

9. The composite of claim 1, wherein the grid is shaped into a curvilinear form.

10. The composite of claim 1, wherein the grid is shaped into a straight form.

11. The composite of claim 1, wherein the composite comprises a plurality of stacked plies, wherein each ply comprises a plurality of overlapping courses with at least one embedded prepreg tow.

12. The composite of claim 11, wherein the composite comprises from 2 to 100 stacked plies.

13. The composite of claim 1, wherein the composite has a thickness from 0.01 inches to 0.50 inches.

14. The composite of claim 1, wherein the grid structure comprises a series of stiffeners, and the stiffeners have a height from 0.05 inches to 0.50 inches.

15. The composite of claim 1, wherein the grid structure comprises a series of stiffeners, and the stiffeners have a width from 0.1 inches to 0.75 inches.

16. The composite of claim 1, wherein the grid structure comprises a series of stiffeners, and the stiffeners are from 1 to 10 inches apart.

17. The composite of claim 1, wherein the curing step comprises heating the precomposite for a sufficient time and temperature to cure the precomposite.

18. The composite of claim 1, wherein the curing step comprises exposing the precomposite to an electron beam (E-beam), microwave, X-ray, or ultraviolet (UV) radiation for a sufficient time and temperature to cure the precomposite.

19. A shaped article comprising the composite of claim 1.

20. The article of claim 19, wherein the article comprises an aircraft part or spacecraft part.

21. A method for producing a composite comprising:
   a. applying at least one embedded prepreg tow to the surface of a base course;
   b. applying a second course to the base course, wherein at least a portion of the second course overlaps with at least one embedded prepreg tow on the base course to produce a precomposite comprising a grid structure; and
   c. curing the precomposite to produce the composite, wherein the grid structure is incorporated within the composite, and the grid structure is not an isogrid or orthogrid.

* * * * *